(12) United States Patent
Prinz et al.

(10) Patent No.: US 11,660,696 B2
(45) Date of Patent: May 30, 2023

(54) WELDING CURRENT SOURCE

(71) Applicant: FRONIUS INTERNATIONAL GMBH, Pettenbach (AT)

(72) Inventors: Andreas Prinz, Pettenbach (AT); Michael Muehlberger, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 709 days.

(21) Appl. No.: 16/468,437

(22) PCT Filed: Mar. 16, 2018

(86) PCT No.: PCT/EP2018/056615
§ 371 (c)(1),
(2) Date: Jun. 11, 2019

(87) PCT Pub. No.: WO2018/167249
PCT Pub. Date: Sep. 20, 2018

(65) Prior Publication Data
US 2021/0283705 A1    Sep. 16, 2021

(30) Foreign Application Priority Data

Mar. 17, 2017 (EP) .................................... 17161498

(51) Int. Cl.
*B23K 9/10* (2006.01)
*B23K 9/095* (2006.01)
(Continued)

(52) U.S. Cl.
CPC ............ *B23K 9/1043* (2013.01); *B23K 9/095* (2013.01); *H01F 27/24* (2013.01); *H01F 27/28* (2013.01); *H02M 3/24* (2013.01)

(58) Field of Classification Search
CPC .. H01F 38/085; H01F 27/38; H01F 2027/408; H01F 27/40; H01F 3/10;
(Continued)

(56) References Cited

U.S. PATENT DOCUMENTS

| 4,897,522 A | 1/1990 | Bilczo et al. |
| 4,897,773 A | 1/1990 | Bilczo |

(Continued)

FOREIGN PATENT DOCUMENTS

| CN | 1404428 A | 3/2003 |
| CN | 101093961 A | 12/2007 |

(Continued)

OTHER PUBLICATIONS

Chinese Office Action in CN 201880004733.9, dated Sep. 30, 2020.
(Continued)

*Primary Examiner* — William J Levicky
*Assistant Examiner* — Adam M Eckardt
(74) *Attorney, Agent, or Firm* — Collard & Roe, P.C.

(57) ABSTRACT

A welding current source for providing a welding current and a welding voltage at an output in order to carry out an arc welding process includes an input-side rectifier, an inverter, which is operated with a switching frequency, a transformer having a primary winding and at least two secondary windings, at least two rectifiers arranged between the secondary windings and the output, and at least one capacitor and one load resistor at the output. At least one current-limiting reactor is arranged on the second secondary winding and the load resistor for discharging the capacitor, which can be charged by the current-limiting reactor, the current-limiting reactor, and the capacitor are dimensioned in such a way that the maximum value of the no-load voltage (Continued)

at the output is greater than the voltage corresponding to the transmission ratio of the primary winding to the secondary winding of the transformer.

12 Claims, 7 Drawing Sheets

(51) Int. Cl.
  *H01F 27/24* (2006.01)
  *H01F 27/28* (2006.01)
  *H02M 3/24* (2006.01)

(58) Field of Classification Search
  CPC .......... H01F 3/14; H01F 37/00; H01F 27/263; H01F 27/28; H01F 2017/0093; H01F 2038/026; H01F 27/24; H01F 27/346; H01F 3/12; H01F 30/04; H01F 30/06; H01F 41/02; B23K 9/10; B23K 9/1056; B23K 9/1031; B23K 9/1043; B23K 9/095; H02M 3/28; H02M 7/5236; H02M 1/4225; H02M 3/33507; H02M 3/33569; H02M 3/33592; H02M 3/337; H02M 1/0064; H02M 3/1584; H02M 1/0032; H02M 1/0058; H02M 1/007; H02M 1/088; H02M 1/36; H02M 3/1586; H02M 3/335; H02M 1/0009; H02M 1/10; H02M 3/1582; H02M 3/3376; H02M 7/217; H02M 1/0025; H02M 1/0035; H02M 1/08; H02M 1/126; H02M 1/0035; H02M 1/4208; H02M 1/4241; H02M 1/44; H02M 3/155; H02M 3/1552; H02M 3/156; H02M 3/157; H02M 3/1588; H02M 3/285; H02M 3/33515; H02M 3/33523; H02M 3/3353; H02M 3/33553; H02M 3/33576; H02M 7/05; H02M 7/219; H02M 7/48; H02M 7/4803; H02M 7/539; H02M 3/24; Y02B 70/10; H03K 17/0406; H03K 17/127; H03K 17/567; H03K 17/063; H03K 19/0963; B25C 1/003; B25C 1/041; Y10T 29/4902; Y10T 29/49071; Y10T 29/49073; Y10T 29/49155; Y10T 29/49156; B65G 15/60; B65G 2201/06; G01R 21/06; G01R 31/40; H02J 9/068; H05K 1/0245; H05K 1/0268; H05K 1/165; H05K 2203/162; Y02P 80/10

See application file for complete search history.

(56) References Cited

U.S. PATENT DOCUMENTS

| | | | |
|---|---|---|---|
| 6,849,828 B2 | 2/2005 | Aigner | |
| 6,995,337 B2 * | 2/2006 | Blankenship | .......... B23K 9/091 |
| | | | 219/130.1 |
| 2004/0119572 A1 * | 6/2004 | Sigl | ........................ H01F 38/085 |
| | | | 336/198 |
| 2007/0051712 A1 * | 3/2007 | Kooken | ............ H02M 3/33523 |
| | | | 219/130.1 |
| 2010/0039206 A1 * | 2/2010 | Klopcic | ................ H01F 38/085 |
| | | | 336/221 |
| 2011/0000900 A1 * | 1/2011 | Luo | ........................ H02M 7/06 |
| | | | 363/126 |
| 2014/0313679 A1 * | 10/2014 | Artelsmair | .............. H01F 41/10 |
| | | | 336/170 |

FOREIGN PATENT DOCUMENTS

| | | | |
|---|---|---|---|
| CN | 202218447 U | | 5/2012 |
| CN | 103078493 A | * | 5/2013 |
| CN | 103368399 A | | 10/2013 |
| DE | 1 189 199 B | | 3/1965 |
| JP | H1092663 A | * | 4/1998 |
| JP | 4275386 B2 | * | 6/2009 |

OTHER PUBLICATIONS

European Office Action in EP 17161498.5-1808, dated Sep. 28, 2017, with English translation of relevant parts.
International Search Report in PCT/EP2018/056615, dated Jun. 11, 2018.

* cited by examiner

WELDING CURRENT SOURCE

CROSS REFERENCE TO RELATED APPLICATIONS

This application is the National Stage of PCT/EP2018/056615 filed on Mar. 16, 2018, which claims priority under 35 U.S.C. § 119 of European Application No. 17161498.5 filed on. Mar. 17, 2017, the disclosure of which is incorporated by reference. The international application under PCT article 21(2) was not published in English.

The invention relates to a welding current source for supplying of a welding current and a welding voltage at an output for the performance of an arc welding process, with an input-side rectifier, an inverter, which is operated at a switching frequency, a transformer with a primary winding and at least two secondary windings, at least two rectifiers arranged between the secondary windings and the output, and at least one capacitor and one load resistor at the output.

Conventional welding current sources with inverters have an input-side rectifier, which rectifies the input alternating voltage to an intermediate circuit voltage. The latter is converted by means of an inverter into a high-frequency alternating voltage of a defined switching frequency, transmitted via a transformer to its secondary side, and rectified with another secondary-side rectifier and fed to the output of the welding current source. The winding ratio of primary winding to secondary winding increases the current on the secondary side of the transformer to the high currents, of the order of several 100 A, required for welding. To attenuate unwanted interference signals in the output voltage or the output current, a capacitor and a load resistor are often arranged at the output. Conventional output voltages of the secondary winding lie in the range between 30V and 70V, which is sufficient to maintain an arc once ignited. However, for purposes of igniting the arc, and/or for purposes of maintaining a stable arc at currents below 20 A, a higher output voltage is required on the secondary side. Also in the event of dynamic demands of the welding process, evoked, for example by a change in arc length, a higher output voltage can also ensure a more stable arc.

The prior art indicates some possible means by which this higher output voltage on the secondary side can be achieved. For example, it can be achieved with voltage-doubling circuits or switched-mode power supplies of known art, although these are linked with additional component complexity. From US 2004/119572 A1 it is also of known art to achieve a higher output voltage at lower currents with a second secondary winding on the transformer, known as a tertiary winding. The second secondary winding has a transmission ratio that differs from that of the first secondary winding, and a higher leakage inductance, so that the voltage at the output of the second secondary winding drops at higher currents. However, the higher leakage inductance of the second secondary winding is linked with complex design solutions. In addition, the voltage range that can be achieved with the second secondary winding is very limited on account of the integral number of turns. The first secondary winding has a very small number of turns, often only one, in order to achieve the high current transmission ratio. Accordingly, the second secondary winding must have at least two turns and therefore has twice the output voltage of the first secondary winding. A third winding, and thus a three-fold output voltage, would usually exceed the maximum values for the output voltage specified by safety regulations. Currently, the maximum voltage permanently permitted at the output of a welding current source is 113V DC.

The invention is therefore based on the object of creating a welding current source based on the prior art as described above, which provides the highest possible output voltage in no-load operation so as to ensure reliable ignition of the arc, while keeping the expenditure for additional components as low as possible. However, the output voltage in no-load operation must still lie below the maximum output voltage as specified by the safety regulations.

The invention provides a solution for the object as set by arranging at least one current-limiting inductor on the second secondary winding, and by dimensioning the load resistor for discharging the capacitor that can be charged via the current-limiting inductor, the current-limiting inductor, and the capacitor, such that the maximum value of the no-load voltage at the output is greater than the voltage corresponding to the transmission ratio of the primary winding to the second secondary winding of the transformer.

If at least one current-limiting inductor is arranged on the second secondary winding, the second secondary winding can be designed with a greater number of turns than the first secondary winding, resulting in a higher output voltage on the second secondary winding than on the first secondary winding. If the rectified output voltages of the first and second secondary windings are connected in parallel in no-load operation with low currents, the higher voltage of the second secondary winding will determine the output voltage. At higher currents, however, the voltage drop at the current-limiting inductor will increase, so that from a certain current the first secondary winding, which is usually designed for a high current load, transfers most of the output current. The resulting output characteristic at low currents enables voltages that are determined by the transmission ratio of the second secondary winding, and high currents corresponding to the transmission ratio of the first secondary winding. With the different transmission ratios of the first and second secondary windings in combination with a current-limiting inductor, improved igniting and stabilisation of the arc can be achieved by an increased no-load voltage, compared to the transmission ratio of the first secondary winding. Nevertheless, at high currents, the transmission ratio of the first secondary winding determines the currents, and the power consumed on the primary side. A welding current source with improved ignition, but nevertheless low power consumption, can thus be created by the arrangement of a current-limiting inductor on the second secondary winding, wherein complex design measures, such as those in US 2004/119572 A1, for example, can be avoided. If, in addition, the load resistor for discharging the capacitor that can be charged via the current-limiting inductor, the current-limiting inductor, and the capacitor, are dimensioned such that the maximum value of the no-load voltage at the output is greater than the voltage corresponding to the transmission ratio of the primary winding to the second secondary winding of the transformer, the welding voltage can be increased further in no-load operation. The oscillating circuit formed by the current-limiting inductor and capacitor is excited each time the input alternating voltage transmitted via the transformer alters, and oscillates at its natural frequency. When the current direction changes, this polarity reversal process is interrupted by the rectifier arranged on the second secondary winding, and the capacitor at the output is charged by way of the output voltage corresponding to the voltage ratio of the second secondary winding. This increased welding voltage in no-load operation results in improved ignition characteristics, since, as is known, striking of the arc can be executed more easily at higher voltages. This makes it much easier to re-ignite an arc that has been extinguished after a short circuit, after the short circuit has been removed. If the load resistor, which discharges the capacitor at the output, is dimensioned such that a maximum output voltage in no-load operation is lower than the output voltage permitted by safety regulations, an improved ignition of the arc can be achieved during the welding start, and the safety regulations can also be fulfilled.

Advantageously, the maximum value of the no-load voltage at the output is 5% to 30% higher than the voltage corresponding to the transmission ratio of the primary winding to the second secondary winding of the transformer. This allows a sufficient increase of the output voltage for improved ignition behaviour, wherein the necessary charging of the capacitor at the output can also be achieved within the time span specified by the switching frequency.

If the load resistor at the output is dimensioned such that the time constant of the RC-element consisting of the said load resistor and the capacitor at the output is between 1 and 20 times the reciprocal of the switching frequency of the inverter, the polarity reversal process can take place to a sufficient extent, and at the same time the maximum value of the output voltage can be lowered to such an extent that safety regulations with regard to the output voltage can be fulfilled.

If the resonant frequency of the oscillating circuit consisting of current-limiting inductor and capacitor at the output is between 3 times and 20 times the switching frequency of the inverter, the polarity reversal process is completed sufficiently quickly in the time span specified by the switching frequency of the inverter. Nevertheless, the current and voltage profiles generated during recharging can remain in a frequency range that can be controlled with little complexity in terms of circuitry.

If the second secondary winding of the transformer has a centre tapping, and the terminal connections of the second secondary winding of the transformer are each connected to a current-limiting inductor, full-wave rectification can be achieved with only two diodes. The component complexity of bridge rectification and the associated costs can be saved.

Further improvements can be achieved if the two current-limiting inductors are formed by one coupled current-limiting inductor. By virtue of the arrangement of the coupled current-limiting inductor on a common magnetic core, asymmetries in the electrical properties of the individual inductor windings can be compensated for, and thus complex measures to prevent transformer saturation can be dispensed with. Compared with the case of two mutually independent current-limiting inductors, which would have to have almost identical electrical properties in order to avoid saturation of the transformer, a much more complex production and/or selection process and the associated additional costs can be dispensed with. The manufacturing costs of a coupled inductor are also usually lower than those of two separate inductors.

If the capacitor at the output is formed by at least two capacitors connected to ground, these can perform additional functions, for example as EMC (electromagnetic compatibility) suppressor capacitors, or as a current path for the high-frequency signals of a high-frequency ignition system that may be present.

The capacitor at the output is preferably at least 10 nF, as this allows sufficient energy to be stored so as to improve the ignition behaviour of the welding current source.

If the current-limiting inductor has an inductance between one fifth of the figure of the reciprocal of the switching frequency and five times the figure of the reciprocal of the switching frequency, the current-limiting inductor can provide a sufficient current limiting function at the maximum current dependent on the power output, and can thus protect the second secondary winding from overload.

The number of turns of the second secondary winding is advantageously at least twice as large as the number of turns of the first secondary winding of the transformer. Since the output voltage provided by the first secondary winding of the transformer is usually less than half the maximum permissible output voltage, an increased no-load voltage can be achieved, which is nevertheless less than the maximum permissible output voltage.

If the power output that can be transmitted via the second secondary winding is greater than 250 W, preferably greater than 500 W, not only can the ignition behaviour of the welding current source be improved, but also the welding characteristics at low currents. This can allow welding at currents less than 50 A with voltages greater than those of the first secondary winding. With special rod electrodes, such as cellulose electrodes, a more stable arc, and thus a better welding result, can be achieved.

The switching frequency is preferably between 20 kHz and 200 kHz, preferably between 40 kHz and 120 kHz, which allows cheaper and lighter transformers to be used.

The welding current source has a particularly advantageous ignition behaviour if the maximum value of the no-load voltage at the output is between 90V and 113V DC, wherein usual safety regulations can be observed at the same time.

The objective invention is explained in more detail below with reference to FIGS. 1 to 7. The figures show advantageous configurations of the invention in an exemplary, schematic and non-restrictive manner. Here:

Figure 1:
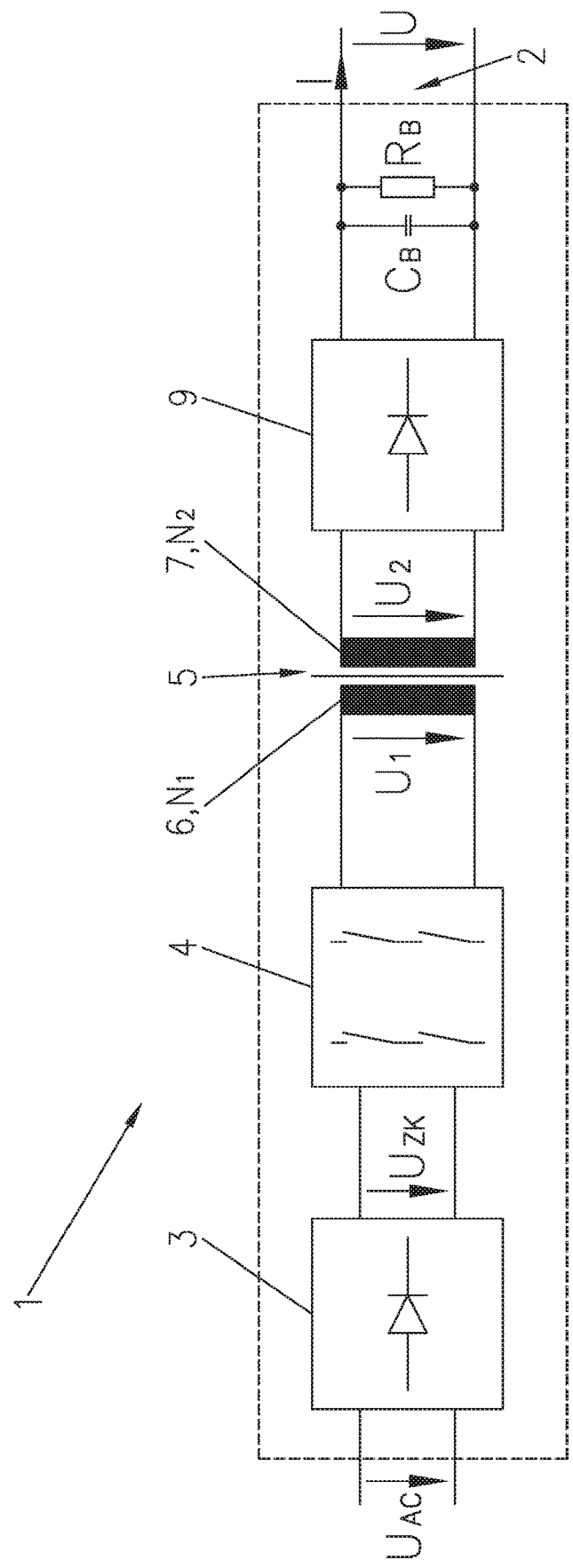
FIG. 1 shows a block diagram of a primary clocked welding current source.

FIG. 1 shows a block diagram of a primary clocked welding current source 1 for supplying of a welding current I and a welding voltage U at an output 2 for the performance of an arc welding process, for example a TIG welding process, a rod electrode welding process, or a MIG/MAG welding process. The input voltage $U_{AC}$ is rectified to the intermediate circuit voltage $U_{ZK}$ by means of an input-side rectifier 3. A power factor correction filter (PFC filter), which is not described in any further detail, or also a so-called booster, can also be used for purposes of increasing, smoothing and/or stabilising the intermediate circuit voltage $U_{ZK}$. A downstream inverter 4, which is embodied, for example, in the form of a full bridge, generates an alternating voltage $U_1$ with the switching frequency $f_S$, which is applied to the primary winding 6 of a transformer 5. This alternating voltage $U_1$ is approximately a square-wave voltage and is transformed down to the voltage $U_2$ by the transformer 5 in order to achieve at the same time a high current transformation ratio, and thus a high welding current I. Accordingly, the secondary winding 7 of the transformer 5 has a high current carrying capacity in order to be able to provide welding currents I of the order of several 100 A, for example up to 600 A. The current on the secondary winding 7 of the transformer 5 is rectified via an output-side rectifier 9 and is provided at the output 2. In addition, a capacitor $C_B$ and a load resistor $R_B$ are arranged at the output 2 so as to dampen disturbances.

Figure 2:
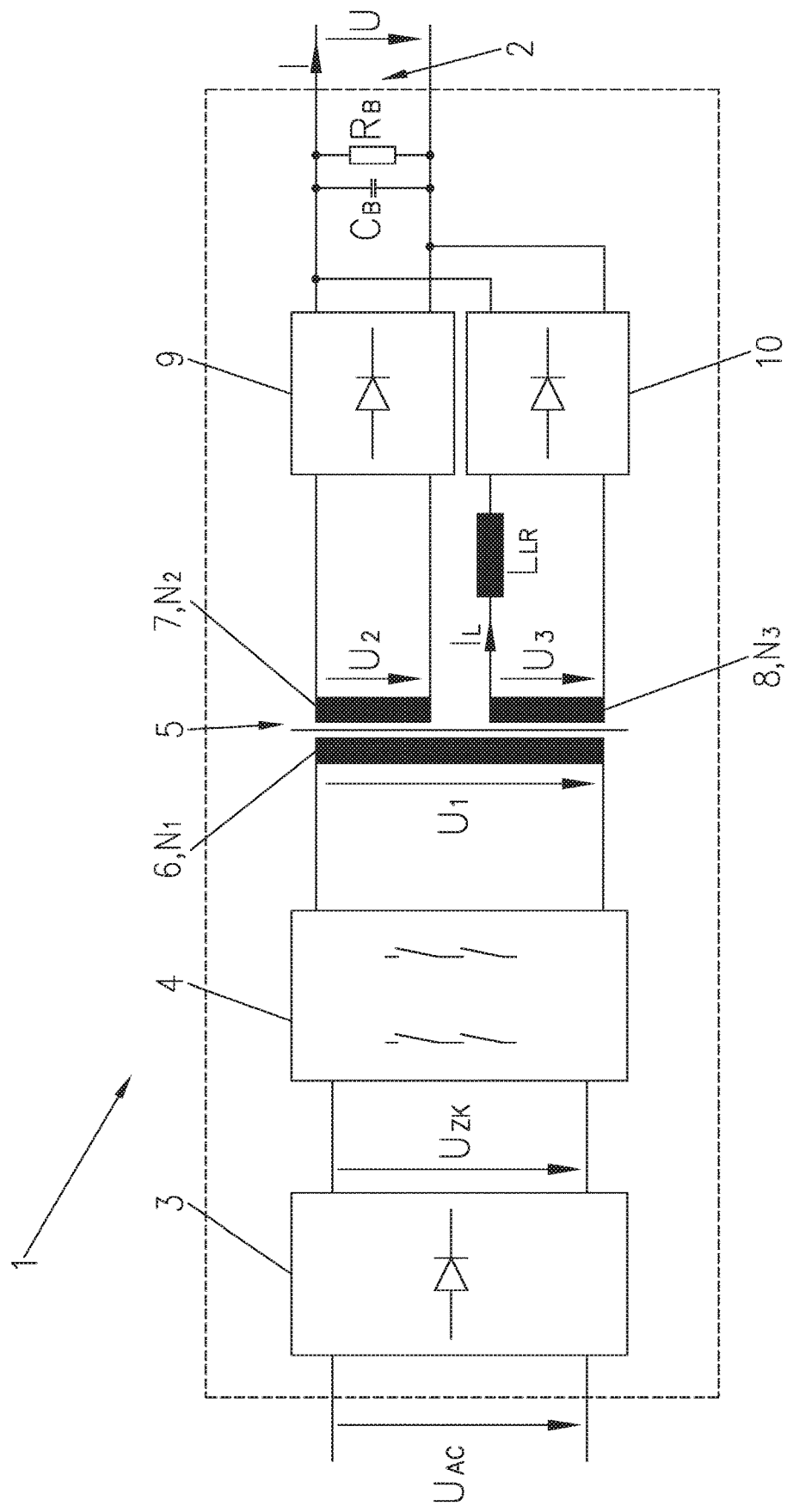
FIG. 2 shows a diagrammatic circuit of a first embodiment of an inventive welding current source.

A second secondary winding 8 of the transformer 5 can be seen in the diagrammatic circuit of a first embodiment of an inventive welding current source 1 as shown in FIG. 2. The voltage $U_3$ of the second secondary winding 8 is fed via a further output-side rectifier 10 to the output 2 of the welding current source 1. This second secondary winding 8 is embodied with a larger number of turns $N_3$ than the number of turns $N_2$ of the first secondary winding 7. This results in a higher voltage $U_3$ on the second secondary winding 8 than on the first secondary winding 7. In no-load operation, the voltage $U_3$ on the second secondary winding 8 is therefore dominant at the output 2, and specifies the no-load output voltage $U_{LL}$ of the welding current source 1.

To save costs, however, the second secondary winding 8 is embodied with less power output than the first secondary winding 7, which can deliver the high welding currents I. For this purpose, in accordance with the invention a current-limiting inductor $L_{LR}$ is arranged on the second secondary winding 8, which causes a voltage drop at high currents I, and thus limits the current $I_L$ of the second secondary winding 8. The deployment of the $L_{LR}$ current-limiting inductor means that the high no-load voltage $U_{LL}$ is provided by the second secondary winding 8, and the very high currents I in the welding operation are provided by the first secondary winding 7. The increased no-load voltage $U_{LL}$ instigates improved ignition behaviour, but can only be specified within coarse ranges by virtue of the transmission ratios of the transformer 5. For the high current transformation ratio, the first secondary winding 7, which is designed for welding operation at high currents, often has only one winding with a no-load voltage $U_{2LL}$ of 45 V, for example. If the second secondary winding 8 is embodied with two windings, it has a no-load voltage $U_{3LL}$ of 90 V. With three windings, however, the second secondary winding 8 would already have a no-load voltage $U_{3LL}$ of 135V, as a result of which current safety standards, which only allow a maximum value of 113V DC, would not be fulfilled. In order, nevertheless, to fulfil the safety standards, complex and cost-intensive safety measures would be required in the design of the circuit.

The oscillating circuit ensuing from the current-limiting inductor $L_{LR}$ and capacitor $C_B$ is dimensioned such that during voltage jumps at the transformer 5, which occur with every change in polarity of the square-wave voltage $U_1$, the capacitor $C_B$ at the output 2 is charged by a polarity reversal process with the oscillating circuit frequency $f_{O1}$, $f_{O2}$. After charging the capacitor $C_B$ at the output 2, the said polarity reversal process is interrupted by the output-side rectifier 10. The load resistor $R_B$ for discharging the capacitor $C_B$ is dimensioned such that the maximum value of the no-load voltage $U_{LL}$ at the output 2 is higher than the voltage $U_3$ corresponding to the transmission ratio of the primary winding 6 to the second secondary winding 8 of the transformer 5. With the charging and partial discharge of the capacitor $C_B$ utilised in this way, a maximum no-load voltage $U_{LL}$ at the output 2 is achieved that is greater than the voltage $U_3$ corresponding to the transmission ratio, but still less than the welding voltage U permitted by safety regulations.

Figure 3:
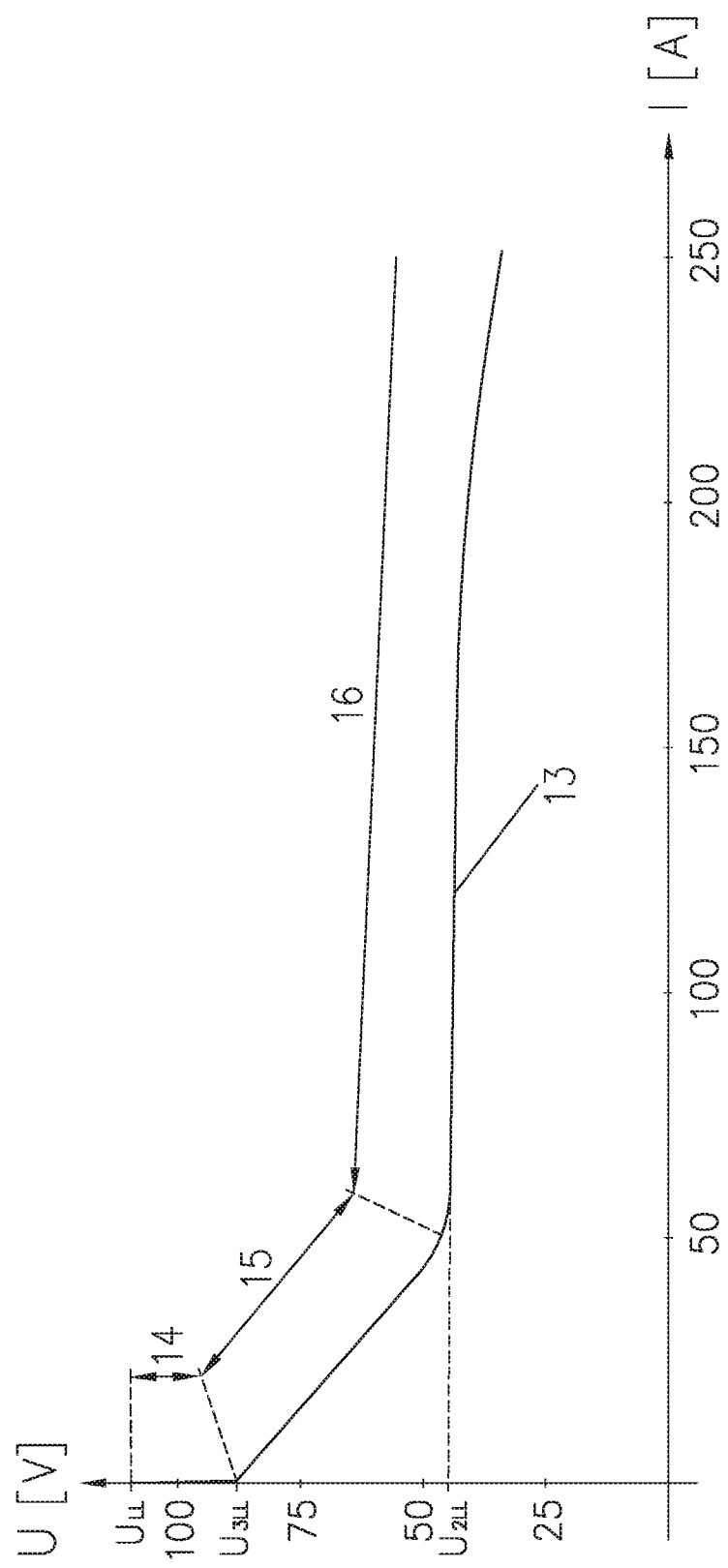
FIG. 3 shows the U/I characteristic of an inventive welding current source.

FIG. 3 shows an example of an output characteristic 13 of an inventive welding current source 1 with a maximum pulse width of the inverter 4. The output characteristic 13 can be divided into three sections 14, 15, and 16. Of these, the first section 14 is located in no-load operation, and represents the maximum voltage increase caused by the charging and partial discharge of the capacitor $C_B$. The energy stored in the capacitor $C_B$ facilitates a simple ignition of the arc. In the second section 15 of the output characteristic 13, the welding voltage U corresponds to the rectified voltage $U_3$ of the second secondary winding 8. With increasing welding current I, the voltage drop at the current-limiting inductor $L_{LR}$ increases and the welding voltage U decreases accordingly. In this current range, the welding current I is transmitted from the second secondary winding 8. In the third section 16 of the output characteristic 13, the welding voltage U is the rectified voltage $U_2$ of the first secondary winding 7. Here, the current-limiting inductor $L_{LR}$ causes such a high voltage drop that further increases in current can only be provided via the first secondary winding 7. Accordingly, high welding currents I are primarily transmitted by the first secondary winding 7.

In the output characteristic 13 as illustrated, the maximum value of the no-load voltage $U_{LL}$ at the output 2 is about 15% higher than the voltage corresponding to the transmission ratio of the primary winding 6 to the second secondary winding 8 of the transformer 5. In general, a range between 5% and 30% is recommended for the increase in the no-load voltage $U_{LL}$, since here a sufficient voltage increase can be achieved for improved ignition behaviour, as can the necessary energy storage in the capacitor $C_B$ at the output 2.

Figure 4:
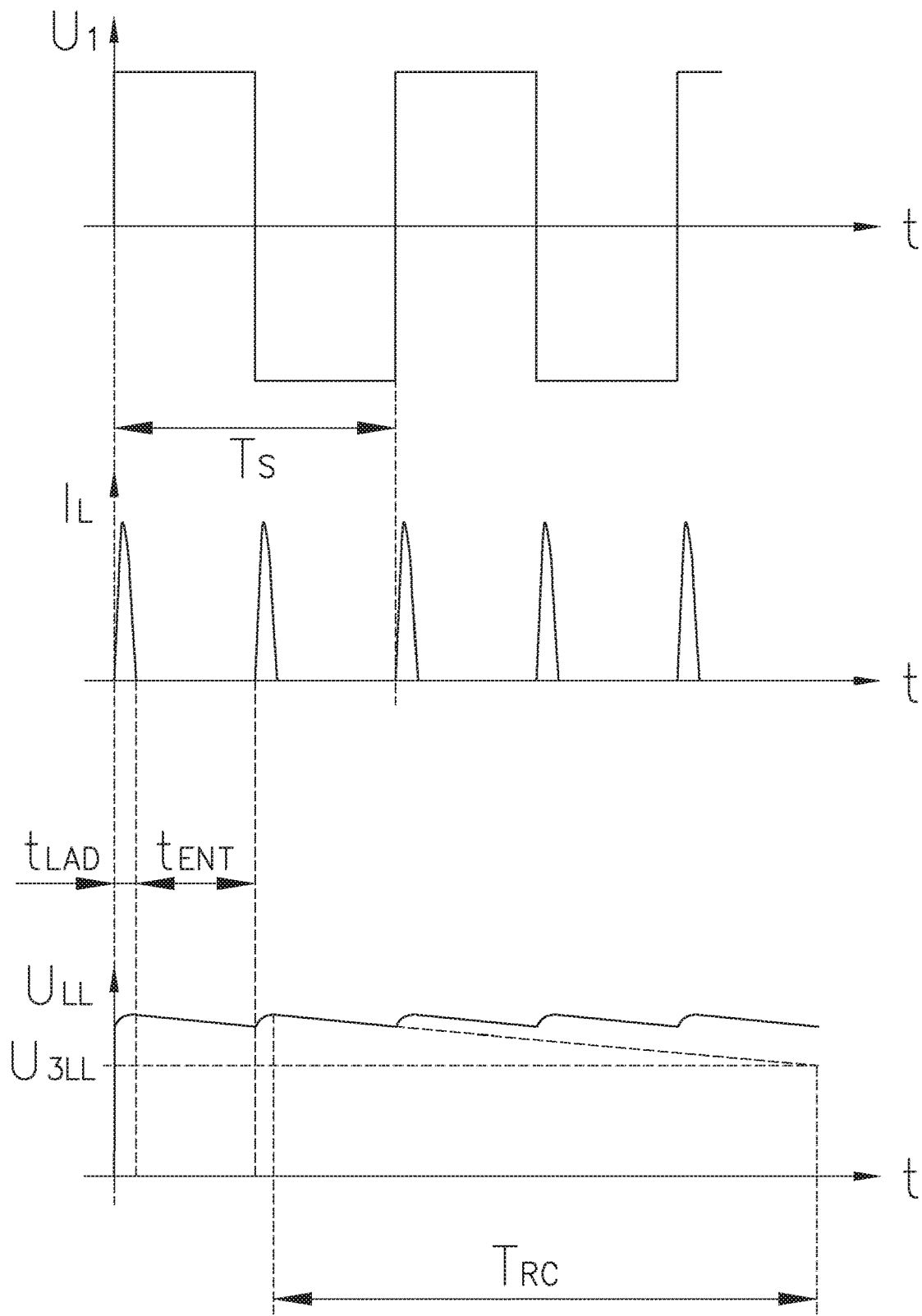
FIG. 4 shows the time courses of current and voltage of an inventive welding current source.

FIG. 4 shows idealised profiles for the voltage $U_1$ on the primary side 6 of the transformer 5, the current $I_L$ through the current-limiting inductor $L_{LR}$, and the no-load voltage $U_{LL}$ at the output 2 of welding current source 1. These are idealised in that circuit elements that are not relevant to the invention, such as circuits for damping that occur in many real circuits (so-called snubber circuits), are not taken into consideration. Similarly, any oscillations caused, for example, by parasitic capacitances of the rectifiers 10, are also neglected. As can be seen from the time profile of the current $I_L$ through the current-limiting inductor $L_{LR}$, after a voltage change in $U_1$, a polarity reversal process is initiated, which instigates the charging of the capacitor $C_B$ at the output 2. With the zero crossing of $I_L$ the output-side rectifier 10 enters a blocking mode, as a result of which the resonant oscillation with the resonant frequency $f_{o2}$ is interrupted at the end of the charging time $t_{LAD}$. The capacitor $C_B$ is then discharged via the load resistor $R_B$ during the discharge time $t_{ENT}$, as can be seen in the time profile of the no-load voltage $U_{LL}$ at the output 2. This sequence is repeated once more within the period $T_S$ of the voltage $U_1$ on the primary side 6 of the transformer 5. The period $T_S$ corresponds to the reciprocal of the switching frequency $f_S$ of the inverter 4.

From FIG. 4 it can also be discerned that the time constant $T_{RC}$ of the RC-element, consisting of the said load resistor $R_B$ and the capacitor $C_B$ at the output 2, is approximately 2 times the reciprocal of the switching frequency $f_S$ of the inverter 4. Depending on the size of the current-limiting inductor $L_{LR}$ and capacitor $C_B$, time constants $T_{RC}$ between 1 and 20 times the reciprocal of the switching frequency $f_S$ of inverter 4 can be advantageous. The said time constant $T_{RC}$ is used to configure the discharge of the capacitor $C_B$, and thus the maximum value of the no-load voltage $U_{LL}$ of the welding current source 1. Safety regulations regarding the level of the welding voltage U can thus be fulfilled.

Figure 5:
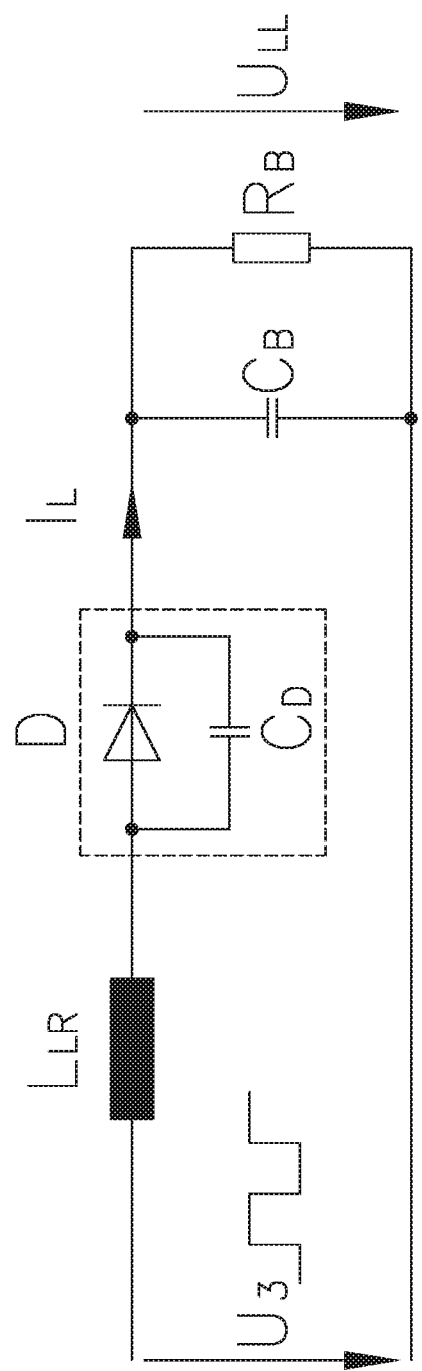
FIG. 5 shows a simplified circuit diagram to explain the no-load voltage profile.

FIG. 5 shows a simplified circuit diagram to explain the profile of the no-load voltage $U_{LL}$. The input voltage $U_3$, ideally assumed to be of square-wave form, is present in a circuit arrangement consisting of the current-limiting inductor $L_{LR}$, a diode D with a parasitic capacitance $C_D$ as well as the capacitor $C_B$ and load resistor $R_B$. The no-load output voltage $U_{LL}$ is formed at the capacitor $C_B$ and the load resistor $R_B$.

Figure 6:
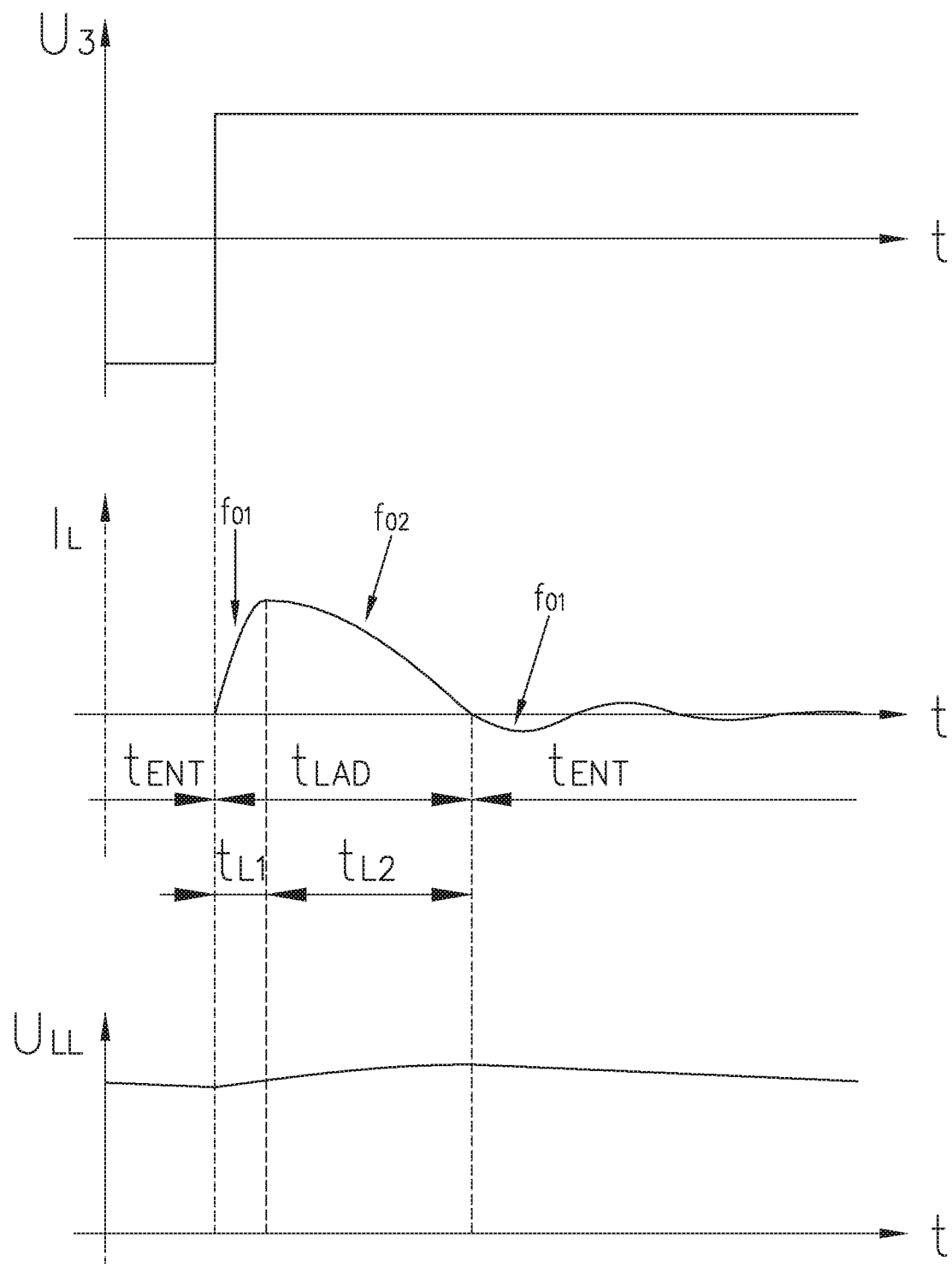
FIG. 6 shows the time courses of current and no-load voltage for the circuit arrangement in FIG. 5.

FIG. 6 shows the time courses of the input voltage $U_3$, the current $I_L$, and the no-load voltage $U_{LL}$ of the circuit as shown in FIG. 5. Strictly speaking, FIG. 6 shows a positive alteration of the input voltage $U_3$ in the steady state, and its effect on the current $I_L$ and the no-load voltage $U_{LL}$. Immediately after the positive alteration of the input voltage $U_3$, the diode D is non-conducting. Thus an oscillating circuit is excited by the alteration in voltage, by way of the current-limiting inductor $L_{LR}$ and the parasitic capacitance $C_D$ of the diode D, as well as the capacitor $C_B$ at the output. From the profile of the current $I_L$ it can be seen that the frequency of the free oscillation is approx.

$$f_{01} = \frac{1}{2\pi\sqrt{L_{LR}\frac{C_D \cdot C_B}{C_D + C_B}}}$$

and in the example of embodiment illustrated lasts for about a ¼-period of the free oscillation. This corresponds to the time period $t_{L1}$ in FIG. 6. This discharges $C_D$ to the extent such that a voltage is applied to the diode D in the forward direction. The diode D becomes conducting, and the oscillating circuit is now formed by the current-limiting inductor $L_{LR}$ and the capacitor $C_B$ at the output 2. The frequency of the free oscillation is now approx.

$$f_{02} = \frac{1}{2\pi\sqrt{L_{LR} \cdot C_B}}$$

and continues in the example of embodiment for about a ¼-period, the time period $t_{L2}$ of the free oscillation now present. The current $I_L$ then crosses zero, causing the diode D to switch back into the non-conducting state. Over the time period $t_{LAD}=t_{L1}+t_{L2}$ the capacitor $C_B$ at the output 2 is charged and at the same time the no-load voltage $U_{LL}$ increases. Subsequently, with the diode D in blocking mode, an oscillating circuit is again formed with the parasitic capacitance $C_D$ of the diode D and the oscillation frequency $f_{01}$. Here, however, just a decaying oscillation of the energy takes place between the current-limiting inductor $L_{LR}$ and the parasitic capacitance $C_D$ of the diode D together with the capacitor $C_B$ at the output 2. This polarity reversal process, however, does not contribute significantly to either the charging or the discharging of the capacitor $C_B$ at the output 2. Rather, a discharge of the capacitor $C_B$ takes place in the period $t_{ENT}$ via the load resistor R. This is also evident from the falling no-load voltage $U_{LL}$ in the period $t_{ENT}$.

Furthermore, the resonant frequency $f_{02}$ of the resonant circuit consisting of the current-limiting inductor $L_{LR}$ and capacitor $C_B$ at the output 2 is approx. 5 times the switching frequency $f_S$ of the inverter 4. The polarity reversal process and thus the charging of the capacitor $C_B$ are thus executed sufficiently quickly. In the current and voltage profiles shown in FIG. 4, the recharging is completed after approx. 1/10 of the period $T_S$ of the transformer alternating voltage $U_1$. In general, a resonant frequency $f_{02}$ of the resonant circuit in terms of the current-limiting inductor $L_{LR}$ and the capacitor $C_B$, of between 3 and 20 times the switching frequency $f_S$ of the inverter 4 can be recommended here.

Here the polarity reversal process is sufficiently fast, but is nevertheless within a frequency range that can easily be controlled by the circuitry.

Figure 7:
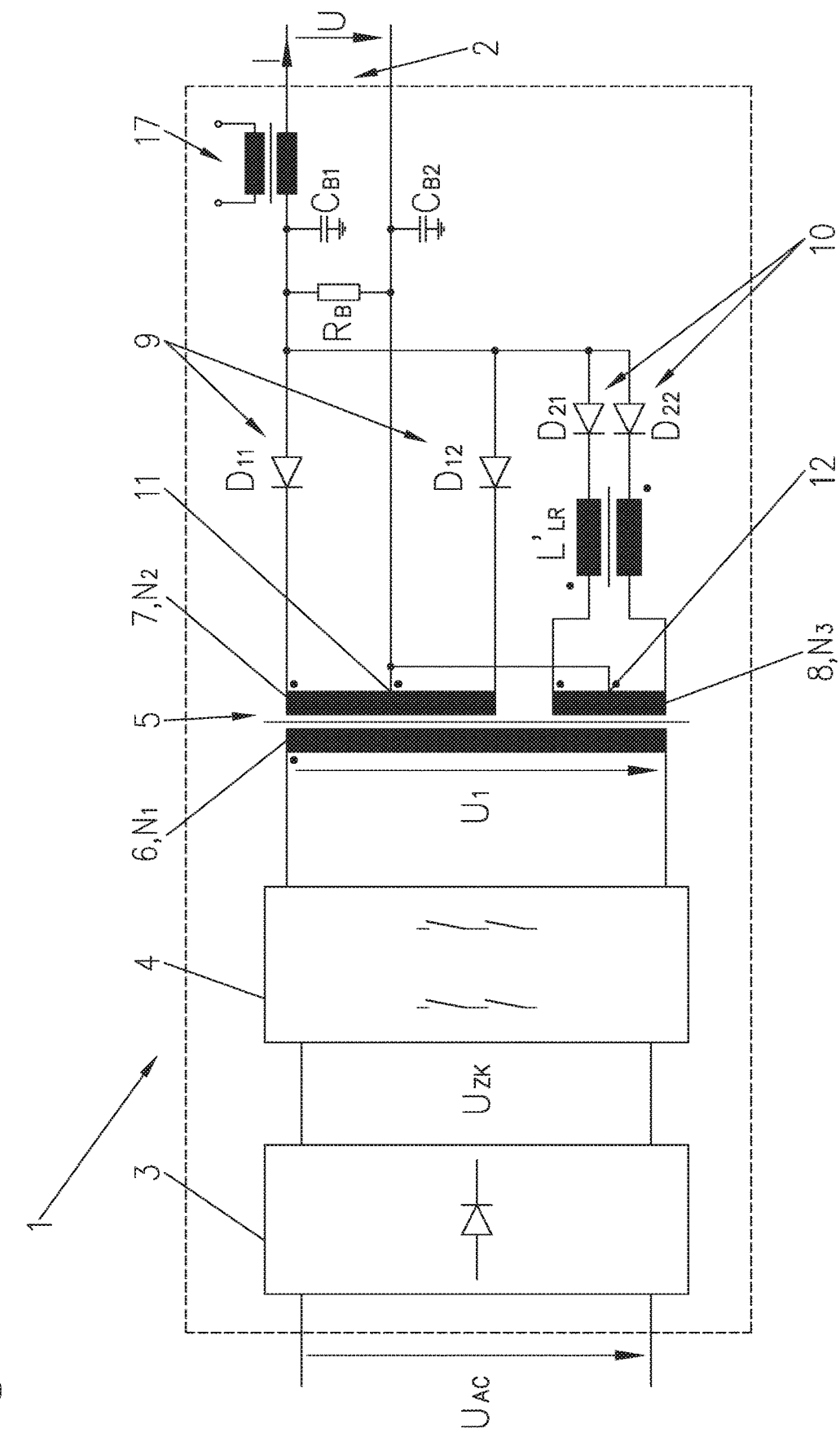
FIG. 7 shows a diagrammatic circuit of a further embodiment of an inventive welding current source.

FIG. 7 shows a diagrammatic circuit of a further embodiment of an inventive welding current source 1. Snubber circuits that may be necessary to suppress high-frequency signals, smoothing inductors at the output, together with other circuit components that are not relevant to the invention, are not shown in this diagrammatic circuit. The secondary windings 7, 8 of the transformer 5 of the embodiment shown in FIG. 7 are embodied with centre tappings 11, 12. A full-wave rectification can be implemented by means of only two diodes $D_{11}$, $D_{12}$, or $D_{21}$, $D_{22}$, as a result of which the extra components and associated costs for a bridge rectification are saved. For purposes of cost reduction it can be advantageous to use identical diodes for the diodes $D_{11}$, $D_{12}$, $D_{21}$, $D_{22}$.

Both terminal connections of the second secondary winding 8 of the transformer 5 are connected to a coupled current-limiting inductor $L'_{LR}$. By virtue of the arrangement of the coupled current-limiting inductor $L'_{LR}$ on a common magnetic core, any asymmetries of the electrical properties of the individual inductor windings are compensated for, and saturation of the transformer 5 is prevented. A more complex form of production and/or selection and the associated additional costs are prevented.

In the example of embodiment shown in FIG. 7, the capacitance at the output 2 is formed by two capacitors $C_{B1}$, $C_{B2}$ connected to ground. These capacitors $C_{B1}$, $C_{B2}$ not only have the function of increasing the no-load voltage $U_{LL}$ in accordance with the invention, but also the function of EMC suppression capacitors, resulting in cost savings. The capacitors $C_{B1}$, $C_{B2}$ also close the current path for the signals of a high-frequency ignition system 17, shown schematically.

The improvement of the ignition characteristics of the welding current source 1 not only depends on the level of the no-load voltage $U_{LL}$, but also, in the present case, on the amount of energy stored in the capacitor $C_B$, that is to say, $C_{B1}$, $C_{B2}$. Therefore, the capacitor $C_B$ should comprise at least 10 nF so as to ensure sufficient ionisation of the gas in the ignition path. In the example of embodiment shown in FIG. 7, this would mean that each of the capacitors $C_{B1}$, $C_{B2}$ has a capacitance of at least 20 nF.

The magnitude of the inductance of the current-limiting inductor $L_{LR}$ can be estimated approximately from the formula $$L_{LR} = \frac{(U_3 - U_2)^2}{4 \cdot P_{3max} \cdot f_S}$$

If a range from 40V to 70V is assumed for $U_3-U_2$, and a range between 250 W and 2000 W is assumed for the power $P_{3max}$, there ensues for the inductance of the current-limiting inductor $L_{LR}$ a range between one fifth of the figure of the reciprocal of the switching frequency $f_S$ and five times the figure of the reciprocal of the switching frequency $f_3$. For welding current sources 1 with a maximum welding current of less than 600 A, a range from half to two-and-a-half times the figure of the reciprocal of the switching frequency $f_S$ has proved to be particularly advantageous.

Once the capacitor $C_B$ and the current-limiting inductor $L_{LR}$ have been determined, the dimensioning of the load resistor R can beneficially be executed by way of a cautious approach using at least two values of R. The circuit arrangement is preferably put into operation with a load resistor R at the lower limit of the range. A first value for R thus ensues as $$R = \frac{1}{f_S \cdot C_B}.$$

Depending on the resulting first no-load voltage $U_{LL}$, a second measurement of the no-load voltage $U_{LL}$ can be executed, for example, at 5 times the value of the load resistor R. By linear interpolation and, if necessary, a further iteration, the required magnitude of the load resistor R for the desired no-load voltage $U_{LL}$ can be determined.

In the example shown in FIG. 7, the primary winding 6 has a number of turns $N_1=9$, the first secondary winding 7 has a number of turns $N_2=1+1$, and the second secondary winding 8 has a number of turns $N_3=2+2$. Accordingly, the number of turns $N_3$ of the second secondary winding 8 is twice as large as the number of turns $N_2$ of the first secondary winding 7 of the transformer 5.

The power $P_{3max}$ that can be transmitted via the second secondary winding 8 is preferably more than 250 W, in order not only to improve the ignition behaviour of the welding current source 1, but also the welding characteristics at low currents I. With a transmittable power $P_{3max}$ of 1000 W, for example, voltages U greater than 40V contribute to the stabilisation of the arc at currents I of less than 25 A. On the other hand, at a transferable power $P_{3max}$ of 2000 W, for example, the second secondary winding 8 contributes to the stabilisation of the arc, even at currents I of less than 50 A. This corresponds approximately to the values of the output characteristic shown in FIG. 3. This is particularly advantageous for special rod electrodes, such as cellulose electrodes.

The switching frequency $f_S$ of the primary-side inverter 4 is preferably between 20 kHz and 200 kHz, which allows the use of cheaper and lighter transformers 5.

A particularly beneficial ignition behaviour in compliance with currently applicable safety regulations ensues, if the maximum value of the no-load voltage $U_{LL}$ at the output is between 90V and 113V DC.

The invention claimed is:

1. A welding current source for supplying of a welding current and a welding voltage at an output for the performance of an arc welding process, comprising:
   an input-side rectifier,
   an inverter operated at a switching frequency,
   a transformer with a primary winding and at least first and second secondary windings, the second secondary winding having a greater number of turns than the first secondary winding,
   at least first and second rectifiers, the first rectifier being arranged between the first secondary winding and the output and the second rectifier being arranged between the second secondary winding and the output,
   at least a first capacitor and one load resistor at the output,
   at least a current-limiting inductor arranged on the second secondary winding before the second rectifier, and
   a further current-limiting inductor,
   wherein the load resistor for discharging the first capacitor that can be charged via the current-limiting inductor, the current-limiting inductor, and the first capacitor are dimensioned such that a maximum value of a no-load voltage at the output is greater than a voltage corresponding to the transmission ratio of the primary winding to the second secondary winding of the transformer, and
   wherein the second secondary winding of the transformer has a center tapping, and the second secondary winding of the transformer has first and second terminal connections connected, respectively, to the current-limiting inductor and the further current-limiting inductor.

2. The welding current source in accordance with claim 1, wherein the maximum value of the no-load voltage at the output is 5% to 30% higher than the voltage corresponding to the transmission ratio of the primary winding to the second secondary winding of the transformer.

3. The welding current source in accordance with claim 1, wherein the load resistor at the output is dimensioned such that a time constant of an RC-element comprising said load resistor and the first capacitor at the output is between 1 and 20 times a reciprocal of the switching frequency of the inverter.

4. The welding current source in accordance with claim 1, wherein a resonant frequency of a resonant circuit comprising the current-limiting inductor and the first capacitor at the output is between 3 times and 20 times the switching frequency of the inverter.

5. The welding current source in accordance with claim 1, wherein the current-limiting inductor and the further current-limiting inductor form a coupled current-limiting inductor.

6. The welding current source in accordance with claim 1, further comprising a second capacitor at the output, wherein the first capacitor and the second capacitor at the output are connected to ground.

7. The welding current source in accordance with claim 1, wherein the first capacitor at the output is at least 10 nF.

8. The welding current source in accordance with claim 1, wherein the current-limiting inductor has an inductance between one fifth of a reciprocal of the switching frequency ($f_S$) and five times the reciprocal of the switching frequency ($f_S$).

9. The welding current source in accordance with claim 1, wherein the number of turns of the second secondary winding is at least twice as large as the number of turns of the first secondary winding of the transformer.

10. The welding current source in accordance with claim 1, wherein the second secondary winding can transmit a power greater than 250 W.

11. The welding current source (1) in accordance with claim 1, wherein the switching frequency is between 20 kHz and 200 kHz.

12. The welding current source in accordance with claim 1, wherein the maximum value of the no-load voltage at the output is between 90V and 113V DC.

* * * * *